United States Patent
Foell et al.

(10) Patent No.: US 8,739,256 B2
(45) Date of Patent: May 27, 2014

(54) METHOD FOR PROVIDING ACCESS TO A SERVICE

(75) Inventors: Uwe Foell, Falkensee (DE); Jin Liu, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 253 days.

(21) Appl. No.: 13/121,273

(22) PCT Filed: Oct. 8, 2008

(86) PCT No.: PCT/EP2008/063417
§ 371 (c)(1),
(2), (4) Date: Mar. 28, 2011

(87) PCT Pub. No.: WO2010/040393
PCT Pub. Date: Apr. 15, 2010

(65) Prior Publication Data
US 2011/0179475 A1    Jul. 21, 2011

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC .......................................................... 726/6

(58) Field of Classification Search
USPC ............................................................ 726/6
See application file for complete search history.

(56) References Cited

U.S. PATENT DOCUMENTS

| | | | |
|---|---|---|---|
| 7,237,122 B2* | 6/2007 | Kadam et al. | 713/191 |
| 2006/0053296 A1* | 3/2006 | Busboom et al. | 713/182 |
| 2007/0143829 A1* | 6/2007 | Hinton et al. | 726/5 |
| 2010/0132019 A1* | 5/2010 | Hardt | 726/6 |

FOREIGN PATENT DOCUMENTS

| | | |
|---|---|---|
| WO | 03/073242 A1 | 9/2003 |
| WO | 03/100544 A2 | 12/2003 |
| WO | 2007/068716 A1 | 6/2007 |

OTHER PUBLICATIONS

"Assertions and Protocols for the Oasis Security Assertion Markup Language (SAML) V2.0", OASIS Open, Mar. 15, 2005.
"Security Assertion Markup Language (SAML) V2.0 Technical Overview" Working Draft 8, OASIS Open, Sep. 12, 2005.

* cited by examiner

*Primary Examiner* — Kambiz Zand
*Assistant Examiner* — Dant Shaifer Harriman
(74) *Attorney, Agent, or Firm* — Squire Sanders (US) LLP

(57) ABSTRACT

A system is described comprising a service provider and an identity provider. A user requests access to the service provider and the service provider seeks user credentials from the identity provider. In use, the service provider issues an authentication request, which request specifies details of a plurality of acceptable authentication formats. The identity provider responds to the request either by providing authentication details for said user in one of the formats specified in the request, or by returning an error message indicating that it cannot support any of the specified authentication formats.

15 Claims, 3 Drawing Sheets

METHOD FOR PROVIDING ACCESS TO A SERVICE

The invention relates to identity management and, more specifically, to the provision of user credentials to enable a user to access a service provided by a service provider.

Federated identity management, or the "federation" of identity, describes the technologies that serve to enable the portability of identity information across otherwise autonomous security domains. A goal of identity federation is to enable users of one domain to access data or systems of another domain seamlessly and securely, and without the need for redundant user administration. Eliminating the need for repeated login procedures each time a new application or account is accessed can substantially improve the user experience.

FIG. 1 is a block diagram demonstrating the concept of identity management. FIG. 1 shows a system, indicated generally by the reference numeral 2, comprising an end user 4, a service provider 6 and an identity provider 8. When the end user 4 of the system 2 wants to access a secure resource at the service provider 6, and the service provider 6 requires the user's identity to be authenticated, the identity provider 8 can be used to provide the required authentication information to the service provider.

Security Assertion Markup Language (SAML) is an XML (eXtensible Markup Language) standard for exchanging authentication and authorization data between security domains. For example, SAML is used for exchanging assertion data between an identity provider (a producer of assertions) and a service provider (a consumer of assertions). SAML is a specification defined by the OASIS (Organization for the Advancement of Structured Information standards).

In an exemplary use of the system 2, SAML assumes that the user 4 has enrolled with at least one identity provider (such as the identity provider 8). The identity provider 8 is expected to provide local authentication services to the user. The service provider 6 relies on the identity provider 8 to identify the user 4. When a user 4 wants to access a service that is provided by a service provider 6 who has a contract with the identity provider 8 (i.e. the service provider and the identity provider form at least part of a circle of trust), the service provider 6 requests a user authentication from the identity provider. In response to the service provider's request, the identity provider 8 passes a SAML assertion to the service provider 6. On the basis of this assertion, the service provider can make decisions; for example, the service provider can decide whether to grant access to the resources/services as requested by the user.

FIG. 2 shows an exemplary message sequence, indicated generally by the reference numeral 10, demonstrating the algorithm described above.

The message sequence 10 starts with the end user 4 sending a message 12 to the service provider 6 (for example using a web browser) requesting access to a particular application provided by the service provider 6. The service provider requires user credentials, which credentials are not provided in the request 12.

In order to obtain user credentials, the service provider 6 sends a SAML authentication request 14 to the identity provider 8. Assuming that the user is known to the identity provider 8, the identity provider returns a SAML assertion response 16 providing credentials for the user 4. In response to receiving the assertion response 16, the service provider 6 grants the user access to the requested service (message 18).

According to the SAML 2.0 specification, an authentication request message, such as the message 14, may take the following form:

```
<element name="AuthnRequest"/>
<element name="nameIDPolicy"/>
<attribute name="Format">
<attribute name="SPNameQualifier">
...other attributes...
</NameIDPolicy>
```

The message 14 specifies a single format attribute, a single service provider name qualifier attribute and can be used to specify other attributes. Thus, the format of the message 14 allows the service provider's ID policy to be explicitly described.

In the use of systems for authenticating users, such as the system 2, there are often instances when the identity policy at the service provider does not match the user's policy at the identity provider and/or the user's preferences. For example, the service provider may prefer a user ID to be persistent (i.e. a fixed identity that is associated with the user), whereas the user may prefer a transient user ID to be used, in order to increase security and/or anonymity for the user. In such a situation, a negotiation may be required in order to find an ID policy that is acceptable to both the service provider and the user. This process is often time consuming and is not always straightforward.

The present invention seeks to address at least some of the problems outlined above.

An aspect of the present invention provides a method comprising the steps of: receiving (for example at a service provider) a request from a user for access to a service; and sending an authentication request to an identity provider in order to obtain credentials for said user, wherein said authentication request includes details of a plurality of acceptable authentication formats for said credentials. The authentication request may be sent from a service provider that is providing the said service. In an exemplary embodiment of the invention, the plurality of acceptable authentication formats includes one or more of email, persistent ID, and transient ID formats. The authentication request may include details of all acceptable authentication formats for said credentials.

An aspect of the present invention provides a service provider adapted to: receive a request from a user for access to a service; and send an authentication request to an identity provider in order to obtain credentials for said user, wherein said authentication request includes details of a plurality of acceptable authentication formats for said credentials. The said plurality of acceptable authentication formats may comprise all acceptable authentication formats. In one form of the invention, the service provider is further adapted to provide the user with access to the service in the event that the identity provider provides credentials for the user in an acceptable format.

Another aspect of the present invention provides a method comprising the steps of: receiving (for example at an identity provider) an authentication request from a service provider requesting credentials for a user, wherein the request includes details of a plurality of acceptable authentication formats for the credentials; and returning credentials for the user in response to the authentication request in the event that credentials for the user are available in one of the plurality of acceptable authentication formats. The authentication request may include details of all acceptable authentication formats for said credentials.

A further aspect of the present invention provides an identity provider adapted to: receive an authentication request from a service provider requesting credentials for a user, wherein the request includes details of a plurality of acceptable authentication formats for the credentials; and return credentials for the user to the service provider in response to the request in the event that credentials for the user are available in one of the plurality of acceptable authentication formats. The authentication request may include details of all acceptable authentication formats for said credentials.

An aspect of the present invention provides a method comprising the steps of: sending an authentication request from a service provider to an identity provider in order to obtain credentials for a user, wherein the request includes details of a plurality of acceptable authentication formats for said credentials; and returning credentials for the user from the identity provider to the service provider in response to the request in the event that credentials for the user are available in one of the plurality of acceptable authentication formats. The method may further comprise returning an error message from the identity provider to the service provider in the event that credentials for the user are not available in any of the plurality of acceptable authentication formats. The authentication request may include details of all acceptable authentication formats for said credentials.

A further aspect of the present invention provides a system comprising a service provider and an identity provider, wherein: the service provider is adapted to send an authentication request to the identity provider requesting user credentials in response to a user requesting access to a service provided by the service provider; the authentication request specifies a plurality of acceptable authentication formats for the user credentials; and the identity provider is adapted to respond to the request by providing credentials for said user in the event that credentials for the user are available in one of the plurality of acceptable formats. The identity provider may also return an error message in the event that user credentials are not available in any one of acceptable formats. The authentication request may include details of all acceptable authentication formats for said credentials.

Thus, the present invention provides an efficient mechanism to enable an identity provider to provide a service provider with authentication data (for example in the form of an enhanced SAML assertion) in a format that is acceptable to both the identity provider and the service provider.

In some forms of the invention, the user is provided with access to the requested service in the event that the identity provider provides credentials for the user in one of the plurality of acceptable formats.

In some forms of the invention, the identity provider returns user credentials to the service provider in the event that credentials for the user are available in one of the said acceptable authentication formats. In some forms of the invention, the identity provider returns an error message to the service provider in the event that authentication details are not available in any of the said acceptable authentication formats.

In some forms of the invention, the said plurality of acceptable authentication formats are provided in an ordered list. For example, the authentication formats may be provided with the format most preferred by the service provider being presented first, and the format least preferred by the service provider being presented last. Such an arrangement enables the identity provider to return the most preferred user credentials possible (from the service provider's point of view).

In some forms of the invention, the identity provider considers whether user credentials are available in acceptable authentication formats in the order in which the plurality of acceptable authentication formats are presented in the authentication request.

In some forms of the invention the authentication request and/or the credentials for the user are provided in an XML format. In some forms of the invention, the credentials for the user are in a Security Assertion Markup Language (SAML) format. The credentials may be provided in an enhanced SAML format. In some forms of the invention, the authentication request is in a Security Assertion Markup Language (SAML) format. The authentication request may be provided in an enhanced SAML format.

An aspect of the invention provides a computer program product adapted to: receive a request from a user for access to a service; and send an authentication request to an identity provider in order to obtain credentials for said user, wherein said authentication request includes details of a plurality of acceptable authentication formats for the credentials. The plurality of acceptable authentication formats may comprise all acceptable authentication formats. The computer program product may further comprise any of the features of the aspects of the invention described above.

A further aspect of the present invention provides a computer program product adapted to: receive an authentication request from a service provider requesting credentials for a user, wherein the request includes details of a plurality of acceptable authentication formats for the credentials; and return credentials for the user in response to the request in the event that authentication details are available in one of the said plurality of acceptable authentication formats. The computer program product may further comprise any of the features of the aspects of the invention described above.

A further aspect of the present invention provides a computer program product adapted to receive a request from a user for access to a service; send an authentication request in order to obtain credentials for said user, wherein said authentication request includes details of a plurality of acceptable authentication formats for the credentials; and return credentials for the user in response to the request in the event that authentication details are available in one of the said plurality of acceptable authentication formats. The computer program product may further comprise any of the features of the aspects of the invention described above.

An aspect of the present invention provides a data structure comprising an authentication request for requesting credentials for a user, which user is requesting access to a service, the authentication request including details of a plurality of acceptable authentication formats for the credentials for the user. In one form of the invention, the request incorporates all acceptable authentication formats for the credentials for the user. The plurality of acceptable authentication formats may be presented as an ordered list (for example with the most preferred being present first and the least preferred being presented last). The data structure may be in an XML format. The data structure may be in a Security Assertion Markup Language (SAML) format and may, for example, be an enhanced SAML assertion.

Embodiments of the invention are described below, by way of example only, with reference to the following numbered Figures.

According to the SAML 2.0 specification, only one ID policy can be carried in an authentication request issued by a service provider (such as the service provider 6) to an identity provider (such as the identity provider 8). The ID policy is defined by the service provider and the identity provider responds either with an identity that matches exactly with the policy specified by the service provider, or with an error message. In order to arrive at an identity policy that is acceptable to both the service provider 6 and the user 4, the service provider may try different policies, as described below with reference to FIG. 3.

Figure 3:
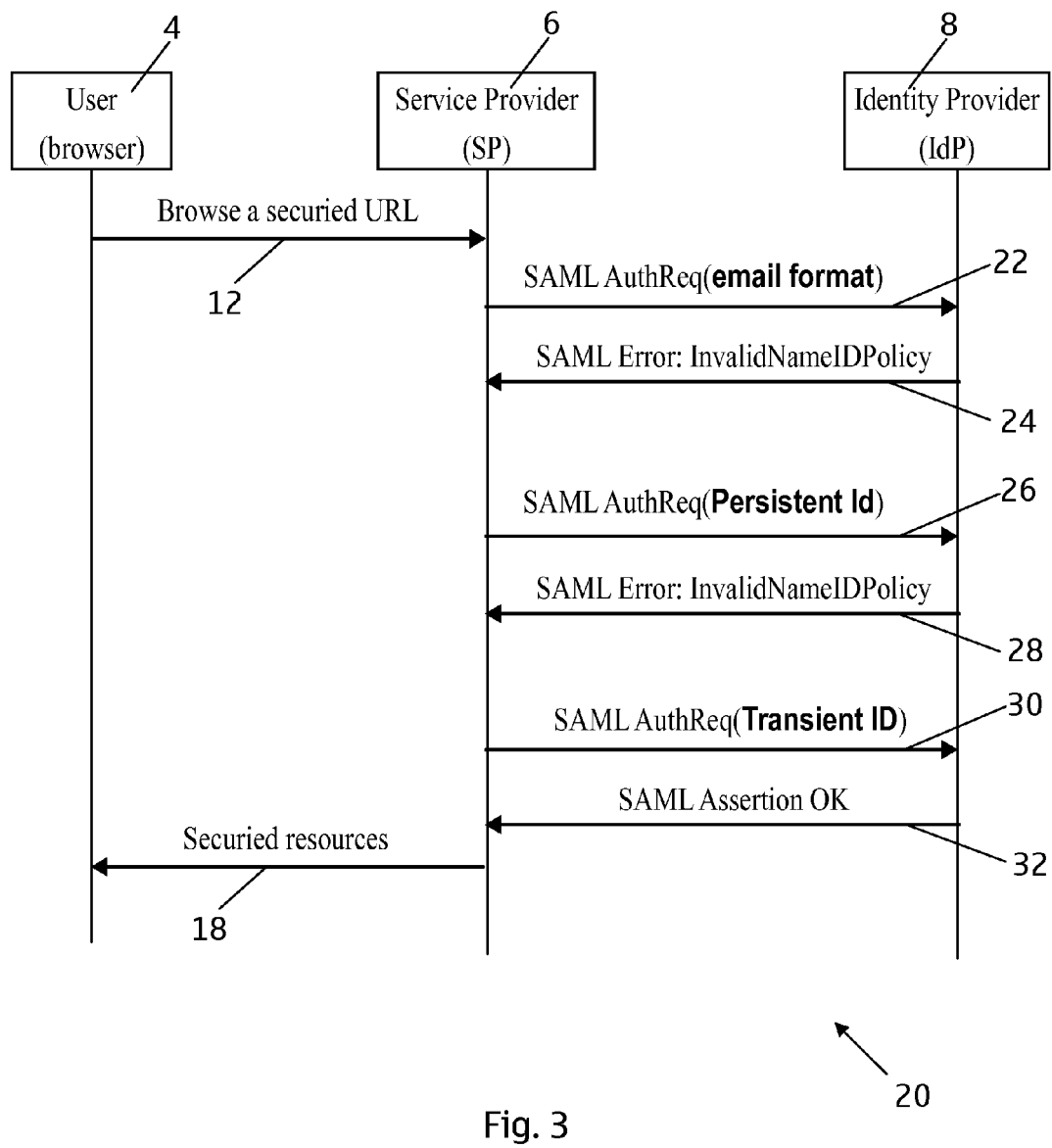
FIG. 3 shows a message sequence demonstrating a further use of the system of FIG. 1.

FIG. 3 shows an exemplary message sequence, indicated generally by the reference numeral 20. The message sequence 20 starts with the end user 4 sending a message 12 to the service provider 6 (for example using a web browser) requesting access to a particular application provided by the service provider 6. The service provider requires user credentials, which credentials are not provided in the request 12.

In an attempt to obtain user credentials, the service provider 6 sends a SAML authentication request 22 to the identity provider 8. As shown in FIG. 3, the authentication request 22 specifies that the authentication should be provided in "email format" (i.e. so that the service provider is informed of the user's email address). The identity provider 8 is not able to provide authentication details in email format (possibly because the identity provider does not support such a format, or because the user preferences do not allow it). Thus, the identity provider 8 returns an error response (message 24).

In response to receiving the error message 24, the service provider 6 sends a second authentication request 26. The second authentication request 26 requests authentication details in the form of a persistent ID. The identity provider 8 is not able to provide a persistent ID for the user and returns an error message (message 28).

In response to receiving the error message 28, the service provider 6 sends a third authentication request 30. The third authentication request 30 requests authentication details in the form of a transient ID. The identity provider 8 is able to provide a transient ID and does so as a SAML assertion 32.

In response to receiving an identity assertion (the assertion 32) from the identity provider 8, the service provider 6 grants the user access to the requested service and sends a message to the user 4 accordingly (message 18).

The iterations required by the algorithm 20 described above cause delay and can consume considerable network resources. Furthermore, the data traffic and data processing loads at both the service provider 6 and the identity provider 8 can be considerable.

The inventors have realised that the problem can be addressed by combining the ID policies acceptable to the service provider 6 into a single authentication request. Such an arrangement is described below with reference to FIG. 4.

Figure 1:
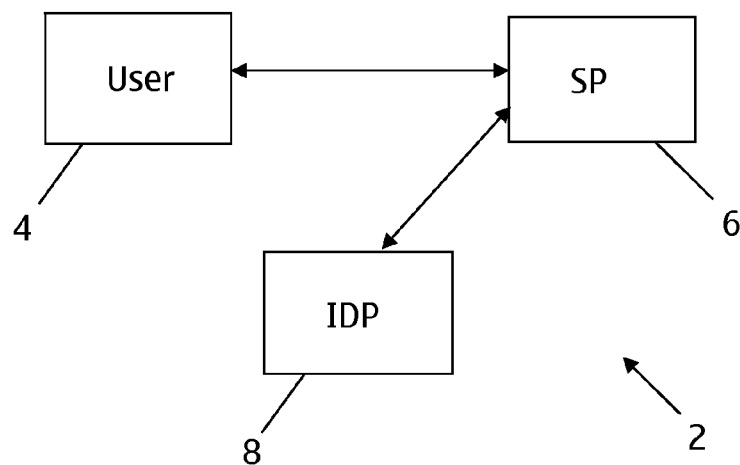
FIG. 1 is a block diagram demonstrating the use of identity management in the prior art.
Figure 2:
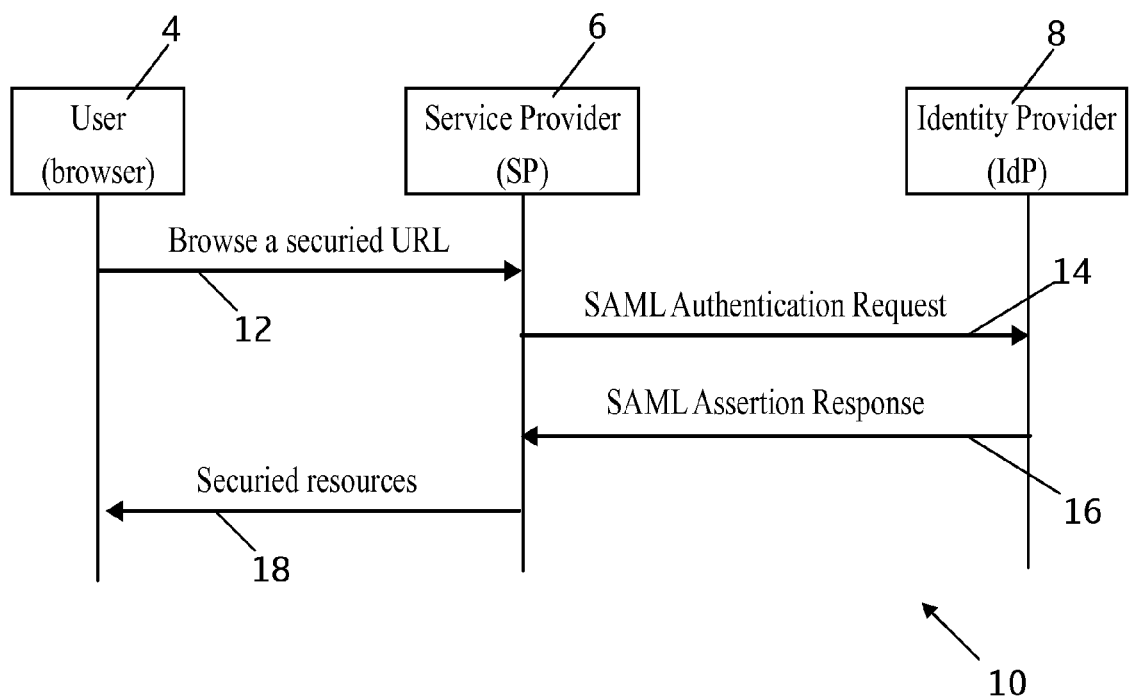
FIG. 2 shows a message sequence demonstrating a use of the system of FIG. 1.
Figure 4:
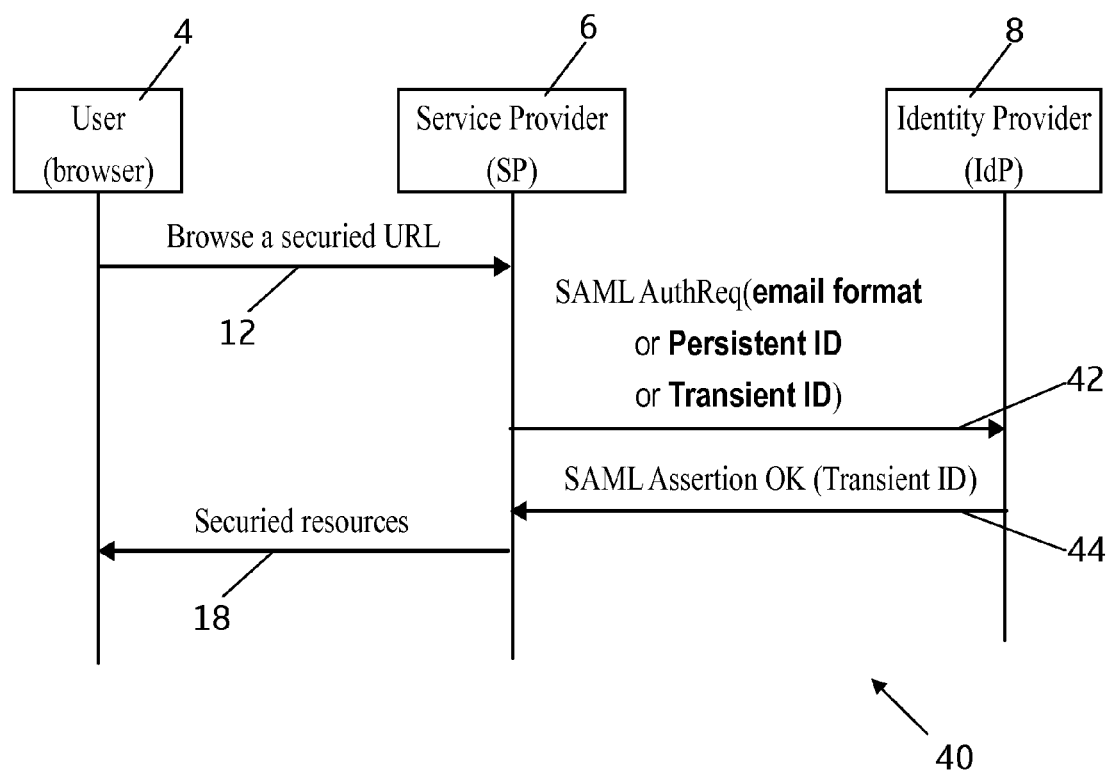
FIG. 4 shows a message sequence demonstrating an aspect of the present invention.

FIG. 4 shows an exemplary message sequence, indicated generally by the reference numeral 40. As described above with reference to FIGS. 1 and 3, the message sequence 40 starts with the end user 4 sending a message 12 to the service provider 6 (for example using a web browser) requesting access to a particular application provided by the service provider 6. The service provider requires user credentials, which credentials are not provided in the request 12.

In an attempt to obtain user credentials, the service provider 6 sends an authentication request 42 to the identity provider 8. As shown in FIG. 4, the authentication request 42 specifies that the authentication should be provided in email format, as a persistent ID, or as a transient ID. The authentication request is referred to an "enhanced SAML authentication request". The identity provider 8 checks each of the identity policies provided in the request in turn until it finds an ID policy that matches the user's and the identity provider's policies. In the example of FIG. 4, the identity provider 8 is not able to provide authentication details in email format or as a persistent ID, but it is able to provide authentication details as a transient ID and does so in SAML assertion 44.

As described above with reference to FIG. 3, in response to receiving an identity assertion (the assertion 44) from the identity provider 8, the service provider 6 grants the user access to the requested service and sends a message to the user 4 accordingly (message 18).

The authentication request 42 may take the following form:

```
<element name="AuthnRequest"/>
<element name="nameIDPolicy"/>
<attribute name="FormatA">
<attribute name="FormatB">
<attribute name="FormatC">
<attribute name="SPNameQualifier">
...other attributes...
</NameIDPolicy>
```

Where "FormatA" is email format, "FormatB" is a persistent ID and "FormatC" is a transient ID.

Thus, in the event that one of the ID policies requested by the service provider is found, the identity provider responds to the service provider in accordance with this policy. Otherwise, the identity provider 8 returns an error message to the service provider or can inform the user that based on the current user preferences, no ID policy match was possible. In some embodiments of the invention, the user may be able to decide whether he is willing to accept the service provider's ID policy in order to get access to the service.

The authentication request 42 may list ID policies in order of preference. In one exemplary embodiment, the ID policies are presented in descending order of preference to the service provider. Thus, in the example described above with reference to FIG. 4, providing user credentials in email format is most preferred by the service provider 6 and providing user credentials as a transient ID is least preferred by the service provider 6. The identity provider may consider each format in turn and respond as soon as an acceptable format is determined, so that the service provider receives the assertion 44 in the most preferred format that the identity provider is able to support.

Of course, the invention is not limited to the particular identity formats (email format, persistent ID and transient ID) described in examples given above.

The embodiments of the invention described above are illustrative rather than restrictive. It will be apparent to those skilled in the art that the above devices and methods may incorporate a number of modifications without departing from the general scope of the invention. It is intended to include all such modifications within the scope of the invention insofar as they fall within the scope of the appended claims.

The invention claimed is:

1. A method comprising the steps of:
   receiving, by a service provider comprising a processor, a request from a user for access to a service; and
   sending an authentication request to an identity provider in order to obtain credentials for said user, wherein said authentication request includes details of a plurality of acceptable authentication formats for said credentials, wherein the plurality of acceptable authentication formats comprises at least one of email, persistent ID, and/or transient ID formats, and the plurality of acceptable authentication formats is arranged in an order of preference comprising a descending order of preference or an ascending order of preference.

2. A method as claimed in claim 1, further comprising the step of providing the user with access to the service in the event that the identity provider provides credentials for the user in one of the plurality of acceptable formats.

3. A method as claimed in claim 1, further comprising the step of receiving, from said identity provider, credentials for the user in response to the authentication request in the event that credentials for the user are available in one of the said acceptable authentication formats.

4. A method as claimed in claim 1, wherein the authentication request includes details of all acceptable authentication formats for said credentials.

5. A method comprising the steps of:
receiving, by an identity provider comprising a processor, an authentication request from a service provider requesting credentials for a user, wherein the request includes details of a plurality of acceptable authentication formats for said credentials; and returning credentials for the user in response to the authentication request in the event that credentials for the user are available in one of the plurality of acceptable authentication formats, wherein the plurality of acceptable authentication formats comprises at least one of email, persistent ID, and/or transient ID formats, and the plurality of acceptable authentication formats is arranged in an order of preference comprising a descending order of preference or an ascending order of preference.

6. A method as claimed in claim 5, further comprising the step of considering whether credentials for a user are available in an acceptable authentication format in the order in which the plurality of acceptable authentication formats are presented in the authentication request.

7. A method as claimed in claim 5, further comprising the step of returning an error message to the service provider in the event that credentials for the user are not available in any of the plurality of acceptable authentication formats.

8. A method as claimed in claim 5, wherein the authentication request includes details of all acceptable authentication formats for said credentials.

9. A service provider comprising:
a processor and memory;
the processor and memory configured to cause the service provider to
receive a request from a user for access to a service; and
send an authentication request to an identity provider in order to obtain credentials for said user, wherein said authentication request includes details of a plurality of acceptable authentication formats for said credentials,
wherein the plurality of acceptable authentication formats comprises at least one of email, persistent ID, and/or transient ID formats, and
the plurality of acceptable authentication formats is arranged in an order of preference comprising a descending order of preference or an ascending order of preference.

10. An identity provider comprising:
a processor and memory;
the processor and memory configured to cause the identity provider to
receive an authentication request from a service provider requesting credentials for a user, wherein the request includes details of a plurality of acceptable authentication formats for the credentials; and
return credentials for the user to the service provider in response to the request in the event that credentials for the user are available in one of the plurality of acceptable authentication formats,
wherein the plurality of acceptable authentication formats comprises at least one of email, persistent ID, and/or transient ID formats, and
the plurality of acceptable authentication formats is arranged in an order of preference comprising a descending order of preference or an ascending order of preference.

11. An identity provider as claimed in claim 10, wherein the processor and memory are further configured to cause the identity provider to return an error message to the service provider in the event that credentials for the user are not available in any of the plurality of acceptable authentication formats.

12. An identity provider as claimed in claim 10, wherein the processor and memory are further configured to cause the identity provider to consider whether user credentials are available in an acceptable authentication format in the order in which the plurality of acceptable authentication formats are presented in the authentication request.

13. A system comprising:
a service provider and an identity provider each comprising a processor and memory, wherein:
the service provider is adapted to send an authentication request to the identity provider requesting credentials for a user in response to said user requesting access to a service provided by the service provider;
the authentication request specifies a plurality of acceptable authentication formats for said credentials; and
the identity provider is adapted to respond to the request by providing credentials for said user in the event that credentials for the user are available in one of the plurality of acceptable formats,
wherein the plurality of acceptable authentication formats comprises at least one of email, persistent ID, and/or transient ID formats, and
the plurality of acceptable authentication formats is arranged in an order of preference comprising a descending order of preference or an ascending order of preference.

14. A computer program, embodied on a non-transitory computer readable medium, the computer program, when executed by a processor, causes the processor to:
receive a request from a user for access to a service; and
send an authentication request to an identity provider in order to obtain credentials for said user, wherein said authentication request includes details of a plurality of acceptable authentication formats for the credentials,
wherein the plurality of acceptable authentication formats comprises at least one of email, persistent ID, and/or transient ID formats, and
the plurality of acceptable authentication formats is arranged in an order of reference comprising a descending order of reference or an ascending order of preference.

15. A computer program, embodied on a non-transitory computer readable medium, the computer program, when executed by a processor, causes the processor to:

receive an authentication request from a service provider requesting credentials for a user, wherein the request includes details of a plurality of acceptable authentication formats for the credentials; and return credentials for the user in response to the request in the event that authentication details are available in one of the said plurality of acceptable authentication formats, wherein the plurality of acceptable authentication formats comprises at least one of email, persistent ID, and/or transient ID formats, and the plurality of acceptable authentication formats is arranged in an order of preference comprising a descending order of preference or an ascending order of preference.

* * * * *